Figure 1:
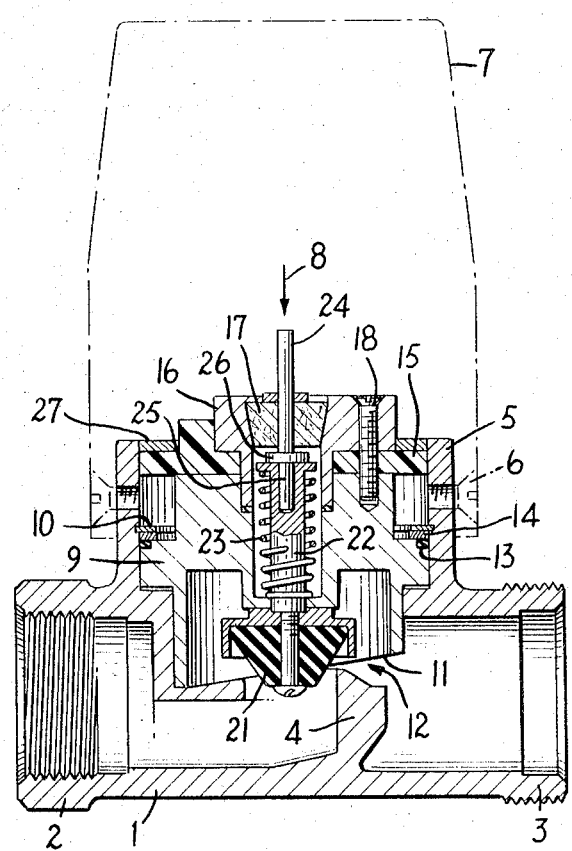

Jan. 10, 1967   H. T. NIELSEN ET AL   3,297,054

PACKED STEM VALVES

Filed Dec. 17, 1963

United States Patent Office 3,297,054
Patented Jan. 10, 1967

3,297,054
PACKED STEM VALVES
Helmar Trøst Nielsen, Nordborg, and Knud Aage Hansen, Sonderborg, Denmark, assignors to Danfoss ved ing. M. Clausen, Nordborg, Denmark, a company of Denmark
Filed Dec. 17, 1963, Ser. No. 331,230
Claims priority, application Germany, Dec. 20, 1963, D 40,568
6 Claims. (Cl. 137—637.4)

This invention relates generally to packed stem valves and more particularly to a throttle valve controllable automatically by a temperature-responsive regulator and having a new and improved packing box construction.

In known throttle valves having a packing box the throttle is preset to desired throttling positions and may remain in this position during operation. However, if the packing box for the valve stem must be repacked the throttle valve setting must be disturbed. Generally these known valves are so constructed that the system in which the valve is located must be isolated in order to permit repacking.

A principal object of the present invention is to provide a packed stem valve in which the throttle may be preset and remain undisturbed and in operation during repacking of the valve stem packing box.

Another object is to provide a simple valve construction in which the packing box may be readily removed from the valve body independently of the throttle member and the valve repacked and the packing box returned to the valve which constantly remains in position allowing fluid flow therethrough without any possibility of leakage even while the packing box is removed.

Another object of the present invention is to provide a throttle valve to which a temperature-sensitive valve operator or regulator may be releasably secured for automatically operating the valve to an open and closed position in dependence upon sensing of a given temperature and responding thereto independently of the throttle setting on the valve.

A feature of the invention is the provision of a throttle valve having a valve body provided with an inlet and an outlet and a valve seat therebetween with a rotary throttle member mounted rotatably in the valve body and positionable to a plurality of angularly spaced positions selectively and relative to said valve body with the positions corresponding to a plurality of throttle settings in which a flow through the valve body is throttled and controlled different amounts thereby varying flow through the valve body. The valve is provided with a valve member operable independently of the throttle member and coaxially therewith. The valve member is operable to a seated position closing the valve and to an unseated position opening the valve. A removable member defining a packing box thereon is mounted on the throttling member for rotation therewith and is removable from the valve body independently of the throttle member and without disturbing the angular position of the throttle.

The valve is provided with valve stem means coaxial with the throttle member and packing box and extending therethrough for actuating the valve member independently of the throttle member. A spring biases the valve member to an unseated position opening the valve and to a raised position in which it engages a central underside portion of the throttle member thereby precluding leakage along the valve stem means upon removal of the packing box during repacking of the valve.

Figure 2:
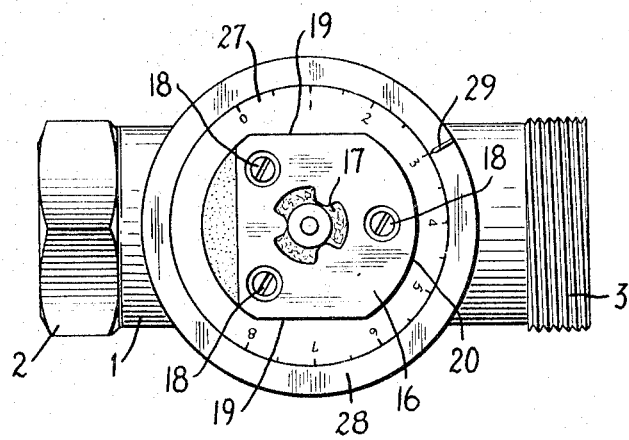

Other features and advantages of the valve in accordance with the present invention will be better understood as described in the following specification and appended claims, in conjunction with the drawings in which:

FIG. 1 is a side elevation section view of a valve according to the invention; and FIG. 2 is a plan view of the valve illustrated in FIG. 1 without a temperature-sensitive regulator attached thereto.

According to the drawing a valve comprising the invention comprises a valve body 1 provided with an inlet 2 and an outlet 3 and a valve seat 4 intermediate therebetween. The valve body is provided with an annular portion 5 to which is removably secured by means of threaded screws 6, a thermostatic valve regulator 7 of which only the housing is shown diagrammatically in broken lines. It being understood that the valve regulator comprises, for example, a temperature-sensitive valve actuator for actuating valve stem means axially in the direction of the arrow 8 as later explained in response to a temperature being sensed.

The valve is provided with a throttle valve member 9 rotatable selectively and held in position internally of a bore or cavity defined by the annular portion 5 of the valve body by a retaining ring 10. The throttle valve member 9 is provided with an inclined throttling surface 11 so that upon rotation of the throttle valve 9 as hereinafter described to selectively preselected angular positions the fluid flow through the valve body is variably throttled in dependence upon the angular position of the throttle member 9. It being understood, that the cross section of opening 12 between the valve seat 4 and the throttling surface 11 is progressively increased or decreased as the throttle valve 9 is rotated angularly relative to the valve body 1. A fluidtight seal is provided between the throttle and the annular portion 5 of the valve body by an O-ring 13 in conjunction with a pressure ring 14.

The throttle is provided with a centrally disposed stepped through bore as illustrated on a shoulder of which is seated means defining a packing box 16 and a seal ring 15 between the uppermost surface of the throttle valve and an annular flange defining a shoulder on the packing box. The packing box 16 is packed with a packing 17 and mounted removably on the throttle by means of a plurality of screws 18 disposed extending axially parallel to valve stem means as illustrated. The packing box member periphery comprises two substantially parallel flat surfaces 19 intermediate of which is disposed an arcuate surface 20 so that the throttle valve can be engaged by a spanner or other type wrench and rotated angularly to preselected angular positions corresponding to the desired throttle settings in which the cross-section of the valve body passageway 12 is varied as heretofore described.

The valve is provided with a valve member 21 operable to a seated position on the seat 4 closing the valve and a raised position opening the valve by a valve stem 22 releasably connected to a second valve stem 24 extending upwardly through a bore in the stuffing box and outwardly of the valve body. The valve stem means 24 is releasably, operably connected to a valve actuator or thermostatic element of the valve regulator, not shown. A loading spring 23 is housed in the through stopped bore of the throttle and is seated on an internal shoulder thereof and bears on a radially extending flange of the connecting stem means 22 constantly biasing the valve 21 to a raised position as illustrated in FIG. 1 in which a top surface of the valve member seats on a central underside portion of the throttle valve circumferentially of the valve stem and precludes any leakage along the valve stem means when the packing box 16 is removed from repacking as hereinafter described. The valve stem 24 having a portion extending outwardly of the valve body and connected to the valve actuator, not shown, is provided with a collar 26 engageable with the underside of the packing 17 in member 16 to preclude unintentional removal of the valve stem 24 upwardly and outwardly of the valve arrangement. The packing 17 is covered as illustrated with cover means. A portion 25 of the valve stem 24 extending downwardly of the collar 26 releasably engages an axial bore in the connecting stem means 22.

In order to provide for accurate throttle settings, the ring bore cover 15 is provided with an annular portion outwardly of the valve body on which is disposed a scale 29 rotatable jointly with the throttle relative to an index mark 29 inscribed or otherwise denoted on the top surface 28 of the valve annular portion 5 as illustrated in FIG. 2.

Those skilled in the art will recognize that by removing the housing 7 and thermostatic regulator therein the valve operator can be easily detached from the valve actuator means 24 and the packing box readily removed from the throttle body by removal of the threaded screws 18 so that the packing box and valve stem 24 can be reworked and the box repacked and then be returned to position without the system in which the valve is installed having to be closed down since the throttle setting remains constant and the valve 21 is in a valve opening position and on the seat defined on the throttle thereby precluding any fluid flow outwardly of the valve through the valve stem means or the central bore of the throttle during the time that the packing box is removed. When the packing box is repacked it is readily replaced in position along with the actuator stem means 24 and the valve regulator, not shown, so that the valve can again readily be operated automatically by the valve regulator.

While a preferred embodiment of the invention has been shown and described, it will be understood that many modifications and changes can be made within the true spirit and scope of the invention.

What we claim and desire to secure by Letters Patent is:

1. A packed stem valve comprising, a valve body having an inlet and an outlet, a throttle member mounted rotatably in said valve body and positionable selectively in operation in a plurality of different angular positions relative to said valve body corresponding to a plurality of throttle positions in which a flow through said valve body is throttled different amounts for varying flow through said valve body, a valve member operable independently of said throttle member to a position closing said valve and to another position opening said valve, means defining a packing box removably mounted on said throttle member and removable from said valve body independently of said throttle member and mounted for angular rotation with said throttle member when mounted thereon, valve stem means operably connected to said valve member and actuatable axially disposed extending through said packing box and throttle member for actuating said valve member to said another position independently of said throttle member, a plurality of threaded screws disposed parallel to said stem means for removably mounting said means defining said packing box on said throttle member, and self-acting means biasing said valve member to said position opening said valve and to a position engaging the underside of said throttle member in an area circumferentially of said valve stem means to preclude leakage along said valve stem means upon removal of said means defining said packing box for packing thereof during operation.

2. A packed stem valve according to claim 1, in which said means defining said packing box comprises surfaces disposed outwardly of said valve body for engagement with a wrench for selectively rotating said means defining said packing box and, therewith, said throttle member to given angular positions of said throttle member for variably throttling a flow through said valve body.

3. A packed stem valve according to claim 2, in which said surfaces comprise two flat substantially parallel surfaces.

4. A packed stem valve according to claim 1, further comprising means defining an annular bore in which said throttle member is rotatably mounted, and an annular cover member disposed extending circumferentially of said throttle member covering a portion of said bore, said cover member being mounted for rotation with said throttle member and having a surface disposed outwardly of said valve body having indicia for indicating positions of said throttle member relative to said valve body thereby to indicate visually throttle settings on said valve.

5. A packed stem valve according to claim 1, in which said valve stem means comprises a first valve stem connected to said valve member and a second stem releasably operably connected to said first stem and actuatable axially and having a portion extending axially outwardly of said valve body.

6. A packed stem valve according to claim 5, in which said valve body comprises means defining a bore in which said throttle member is disposed for rotation and having a surface for removably mounting a thermostatic regulator thereon for connection to said portion of said second valve stem for actuation of said valve member to a position closing said valve in response to a given temperature.

References Cited by the Examiner

UNITED STATES PATENTS

| 1,667,203 | 4/1928 | Harris | 251—214 X |
| 1,788,765 | 1/1931 | Hamblin et al. | 236—12 |
| 2,711,333 | 6/1955 | Rodgers | 277—105 X |
| 2,856,151 | 10/1958 | Peters | 251—230 |
| 3,103,944 | 9/1963 | Shipper | 251—214 X |

FOREIGN PATENTS

| 1,121,853 | 5/1956 | France. |

WILLIAM F. O'DEA, *Primary Examiner.*

ISADOR WEIL, D. R. MATTHEWS,

*Assistant Examiners.*